United States Patent Office 3,202,673
Patented Aug. 24, 1965

3,202,673
1,3,4-OXA(OR THIA)DIAZOLE COMPOUNDS
Jean Metivier, Choisy-le-Roi, and Roger Boesch, Vitry-sur-Seine, France, assignors to Rhone-Poulenc S.A., Paris, France, a corporation of France
No Drawing. Filed June 13, 1963, Ser. No. 287,497
Claims priority, application France, June 19, 1962, 901,238; Nov. 30, 1962, 917,159; Apr. 30, 1963, 933,251
9 Claims. (Cl. 260—307)

This invention relates to new heterocyclic compounds having fungicidal properties, to a process for their preparation, and to compositions containing them.

According to the present invention, there are provided the new 3-trichloromethylthio-1,3,4-oxa(or thia) diazole compounds of the general formula:

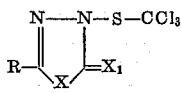

I wherein X and $X_1$ are the same or different and each represents an oxygen or sulphur atom, and R represents a hydrogen atom, an alkyl group which may be substituted by a halogen atom or a nitro or cyano group, an alkenyl group, an aliphatic hydrocarbon group interrupted by an oxygen or sulphur atom or a sulphoxyl or sulphonyl group (e.g., —$CH_2OCH_3$, —$CH_2SCH_3$, —$CH_2$—S—$CH(CH_3)_2$, —$CH_2SOCH_2CH=CH_2$ or —$CH_2SO_2CH_2CH=CH_2$), an alkylthio group, an alkoxycarbonyl group, a carbamoyl group which may be substituted by, for example, one or two alkyl groups, an aryl group (e.g. phenyl or naphthyl) which may be substituted, an aralkyl group containing 7 to 12 carbon atoms (e.g., benzyl), the aryl moiety of which may be substituted and the alkyl moiety of which may be separated from the aryl group by an oxygen or sulphur atom or have its chain interrupted by an oxygen or sulphur atom or a sulphoxyl or sulphonyl group, a cycloalkyl (e.g., cyclohexyl) or cycloalkyl-alkyl group (e.g., cyclohexylmethyl), or a heterocyclyl (e.g., furyl, pyridyl or 1,3,4-oxadiazolyl) or heterocyclyl-alkyl group, the heterocyclic group or moiety being unsubstituted or substituted.

It is to be understood that, in this specification and the accompanying claims, the word "substituted" as applied to aryl and heterocyclyl groups indicates that the group may be substituted by one or more members of the class consisting of halogen atoms, and nitro, cyano, alkyl, alkoxy, alkenyl, alkenyloxy, alkylthio, hydroxy, alkoxycarbonyl, alkanesulphonyl, trifluoromethyl, carbamoyl, sulphamoyl, and alkyl-substituted carbamoyl and sulphamoyl, groups, and the alkyl, alkenyl, aliphatic hydrocarbon, alkoxy and alkane groups referred to contain not more than 4 carbon atoms.

According to the present invention, the heterocyclic compounds of Formula I are prepared by the process which comprises reacting perchloromethylmercaptan (ClSCCl$_3$) with a 1,3,4-oxa(or thia)diazole compound of the general formula:

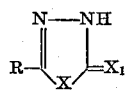

II (wherein X, $X_1$ and R are as hereinbefore defined) or an alkali metal derivative thereof. The reaction is carried out in water or in an inert organic solvent in the presence or absence of a condensing agent, preferably at a temperature between 0° C. and 50° C. As organic solvents there may be employed aromatic hydrocarbons, e.g., benzene or toluene, chlorinated aliphatic hydrocarbons, e.g., methylene chloride, or aliphatic ketones, e.g., acetone. The preferred condensing agents are alkali metal derivatives such as hydroxides or carbonates, or tertiary amines, e.g., triethylamine.

The starting materials of Formula II may be obtained by the reaction of a compound of the formula $CX_1Cl_2$ with a hydrazide of the formula R—CX—$NHNH_2$, X, $X_1$ and R being as hereinbefore defined. The reaction is preferably carried out in water.

The following examples illustrate the preparation of 1,3,4-oxa(or thia)diazole compounds conforming to Formula I by the aforementioned process.

Example I

Perchloromethylmercaptan (17.7 g.) is added, over about 15 minutes, to a solution of 5-methyl-1,3,4-oxadiazol-2-one (9.5 g.) in N sodium hydroxide solution (95 cc.) cooled to about 2° C. The precipitate which forms is collected, washed with water and dried to give 3 - trichloromethylthio-5-methyl-1,3,4-oxadiazol - 2 - one (24 g.), M.P. 69° C. after recrystallisation from cyclohexane.

The 5-methyl-1,3,4-oxadiazol-2-one starting material is prepared according to Dornow and Bruncken, Ber. 82, 121 (1949).

Example II

Perchloromethylmercaptan (18.6 g.) is added, over about 10 minutes, to a solution of 5-(4-methylphenyl)-1,3,4-oxadiazol-2-one (17.6 g.) in N sodium hydroxide solution (100 cc.) cooled to about 2° C. The precipitate which forms is collected, washed with water and dried to give 3-trichloromethylthio-5-(4-methylphenyl)-1,3,4-oxadiazol-2-one (23 g.), M.P. 117° C. after recrystallisation from ethanol.

The 5-(4-methylphenyl)-1,3,4-oxadiazol-2-one starting material, M.P. 161° C., is prepared by reaction of phosgene with 4-methylbenzhydrazide.

Example III

Proceeding as described in Example II but commencing with 5-(4-methoxyphenyl)-1,3,4-oxadiazol-2-one (9 g.), N sodium hydroxide solution (46.8 cc.) and perchloromethylmercaptan (8.7 g.), 3-trichloromethylthio-5 - (4 - methoxyphenyl)-1,3,4-oxadiazol-2-one (11 g.) is obtained, M.P. 111–112° C. after recrystallisation from cyclohexane.

The 5-(4-methoxyphenyl)-1,3,4-oxadiazol-2-one starting material, M.P. 185° C., is prepared by reaction of phosgene with 4-methoxybenzhydrazide.

Example IV

Perchloromethylmercaptan (186 g.) is added over about twenty minutes, to a solution of 5-phenyl-1,3,4-oxadiazol-2-one (162 g.) in N sodium hydroxide solution (1,000 cc.) cooled to about 1° C. When the addition has been completed, stirring is continued for a further twenty minutes. The precipitate which forms is collected, washed with water and dried, giving 3-trichloromethylthio-5-phenyl-1,3,4-oxadiazol-2-one (309 g.), M.P. 126° C. (M.P. 127.5° C. after recrystallisation from acetone).

The 5-phenyl-1,3,4-oxadiazol-2-one starting material, M.P. 139° C., is obtained by reaction of phosgene with benzhydrazide.

Proceeding as described in Example IV but commencing with the appropriate starting materials, the following 1,3,4-oxadiazol-2-one compounds of the stated formulae have been prepared:

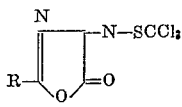

| R | M.P., °C. | R | M.P., °C. |
|---|---|---|---|
| —C₂H₅ | 39 | —CH₂SCH₃ | 77–78 |
| —CH(CH₃)₂ | 38 | —CH₂—SCH₂—CH=CH₂ | 54 |
| —C(CH₃)₃ | 68 | —CH₂—SO—CH₂—CH=CH₂ | 67–68 |
| —CH₂OCH₃ | (¹) | —CH₂—SO₂—CH₂—CH=CH₂ | 86–88 |
| —CH₂—OCH₂—(2,6-dichlorophenyl) | 75–76 | —CH₂S—(4-chlorophenyl) | 65 |
| | | —CH₂CN | 94.5–95 |
| —CH₂—O—(2-Cl,4-Cl-phenyl) | 74 | —CH₂—(cyclohexyl) | 50 |
| —CH₂—(naphthyl) | 91–92 | —(4-nitrophenyl) | 135.5 |
| | | —(furyl) | 104 |
| —(4-chlorophenyl) | 114–115 | —(2,6-dichloropyridyl) | 147–148 |
| —(2,4-dichlorophenyl) | 92–93 | —CH₂—(oxadiazolonyl-SCCl₃) | 149.5–150.5 |

¹ Undistillable oil.

Example V

Perchloromethylmercaptan (9.27 g.) is added, over about ten minutes, to a solution of 5-(2-hydroxyphenyl)-1,3,4-oxadiazol-2-one (8.9 g.) in N sodium hydroxide solution (50 cc.) cooled to about 10° C. When the addition is complete, stirring is continued for ten minutes. The precipitate which forms is collected, washed with water and dried, giving 3-trichloromethylthio-5-(2-hydroxyphenyl)-1,3,4-oxadiazol-2-one (15.5 g.), M.P. 124° C. (M.P. 125° C. after recrystallisation from acetone.)

The 5-(2-hydroxyphenyl)-1,3,4-oxadiazol-2-one starting material is prepared according to Dornow and Bruncken, Ber. 82, 121 (1949).

Proceeding as described in Example V but commencing with the appropriate starting materials, the following 1,3,4-oxadiazol-2-one compounds of the stated formulae have been prepared:

$$R-\underset{O}{\overset{N\!=\!\!=\!\!N-SCCl_3}{\underset{\|}{C}}}\!\!=\!O$$

| R | M.P., °C. | R | M.P., °C. |
|---|---|---|---|
| H— | 90 | | |
| (CH₃)₂CH—S—CH₂— | 75–76 | HO—C₆H₄— | 180 |
| CH₃—S—CH(CH₃)— | (¹) | | |
| CH₃SO₂CH(CH₃)— | 164–165 | C₆H₄—OCH₃ | 170 |
| CH₂=CH—CH₂SCH(CH₃)— | (¹) | | |
| C₂H₅OCO— | 77–78 | C₆H₄—CH₃ | 135 |
| CH₃—NH—CO— | 164 | | |
| C₆H₅—CH₂— | 60 | (CH₃)₂C₆H₃— | 100 |
| C₆H₁₁ (cyclohexyl) | 29–30 | NC—C₆H₄— | 141 |
| | | H₅C₂O—OC—C₆H₄— | 151 |

¹ Undistillable oil.

Example VI

Perchloromethylmercaptan (20.8 g.) is added, over ten minutes, to a solution of 5-phenyl-1,3,4-oxadiazol-2-thione (20 g.) in N sodium hydroxide solution (112 cc.) cooled to about 3° C. When the addition is complete, the precipitate formed is taken up in methylene chloride (150 cc.). The solution obtained is washed with water (2×100 cc.), dried over sodium sulphate, concentrated under reduced pressure and the solid residue recrystallised from ethanol to give 3-trichloromethylthio-5-phenyl-1,3,4-oxadiazol-2-thione (24.5 g.), M.P. 102° C.

The 5-phenyl-1,3,4-oxadiazol-2-thione starting material, M.P. 220° C., is obtained by reaction of thiophosgene with benzhydrazide.

Proceeding as described in Example VI but commencing with the appropriate starting materials, the following 1,3,4-oxadiazol-2-thione compounds of the stated formulae have been prepared:

$$R-\underset{O}{\overset{N\!-\!\!-\!N-SCCl_3}{\underset{\|}{C}}}\!\!=\!S$$

| R | M.P., °C. |
|---|---|
| C₆H₅—CH₂— | 81 |
| C₆H₄—OH | 74 |
| C₆H₄—OCH₃ | 74 |
| C₆H₄—CH₃ | 58 |
| Cl₃CS—N—N (thiadiazol ring, S=,O=) | 210 |

Example VII

Perchloromethylmercaptan (14.6 g.) is added, over about thirty minutes, to a solution of 5-phenyl-1,3,4-thiadiazol-2-one (14 g.) in N sodium hydroxide solution (78.7 cc.) cooled to about 1° C. When the addition is complete, stirring is continued for a further thirty minutes. The precipitate which forms is collected, washed with water and dried, to give 3-trichloromethylthio-5-phenyl-1,3,4-thiadiazol-2-one (24.5 g.), M.P. 141–142 ° C. (M.P. 145° C. after recrystallisation from acetone.)

The 5-phenyl-1,3,4-thiadiazol-2-one starting material, M.P. 151° C., is obtained by reaction of phosgene with thiobenzhydrazide.

Example VIII

Perchloromethylmercaptan (50.8 g.) is added, over about twenty minutes, to a solution of 5-methylthio-1,3,4-thiadiazol-2-one (40.5 g.) in N sodium hydroxide solution (273 cc.) cooled to about 0° C. When the addition is complete, stirring is continued for a further twenty minutes. The precipitate which forms is collected, washed with water and dried to give 3-trichloromethylthio-5-methylthio-1,3,4-thiadiazol-2-one (71 g.), M.P. 56–58° C. (M.P. 64–64.5° C. after recrystallisation from cyclohexane).

The 5-methylthio-1,3,4-thiadiazol-2-one starting material, M.P. 94–95° C., is obtained by reaction of dimethylcarbamoyl chloride with methyl dithiocarbazinate in pyridine under reflux.

Example IX

Perchloromethylmercaptan (27.9 g.) is added, over about thirty minutes, to a solution of 5-phenyl-1,3,4-thiadiazol-2-thione (29.1 g.) and triethylamine (15.2 g.) in methylene chloride (1,500 cc.) at 5° C. When the addition is complete, stirring is continued for a further thirty minutes. The solution is then washed with water, dried over sodium sulphate and concentrated under reduced pressure. The residue is well worked with acetic acid (50 cc.), filtered and dried, to give 3-trichloromethylthio-5-phenyl-1,3,4-thiadiazol-2-thione (29 g.), M.P. 108° C. after first melting at 104° C. after recrystallisation from petroleum ether.

The 5-phenyl-1,3,4-thiadiazol-2-thione starting material, M.P. 216–217° C., is obtained by reaction of thiophosgene with thiobenzhydrazide.

The trichloromethylthio-1,3,4-oxa(or thia)diazole compounds of Formula I possess fungicidal properties. Preferred compounds are those in which X and $X_1$ represent oxygen atoms and, in particular, 3-trichloromethylthio-5-phenyl-1,3,4-oxadiazol-2-one,
3-trichloromethylthio-5-methylthiomethyl-1,3,4-oxadiazol-2-one,
3-trichloromethylthio-5-allylsulphonylmethyl-1,3,4-oxadiazol-2-one,
3-trichloromethylthio-5-cyclohexylmethyl-1,3,4-oxadiazol-2-one,
3-trichloromethylthio-5-isopropylthiomethyl-1,3,4-oxadiazol-2-one,
3-trichloromethylthio-5-ethoxycarbonyl-1,3,4-oxadiazol-2-one,
3-trichloromethylthio-5-methylcarbamoyl-1,3,4-oxadiazol-2-one, and
3-trichloromethylthio-5-benzyl-1,3,4-oxadiazol-2-one.

The fungicidal properties of the compounds of Formula I may be utilised for agricultural purposes; in particular, the compounds are active against apple-scab, potato blight and tobacco mildew.

Accordingly, there are provided, as another feature of the invention, fungicidal compositions containing at least one 1,3,4-oxa(or thia)diazole compound of Formula I in association with one or more diluents compatible with the oxa(or thia)diazole and suitable for use in agricultural fungicidal compositions. Preferably the compositions contain between 0.005% and 90% by weight of oxa(or thia)diazole. The compositions may be solid if there is employed a powdered solid compatible diluent such as talc, calcined magnesia, magnesium silicate, kieselguhr, tricalcium phosphate, powdered cork, absorbent charcoal, or a clay such as kaolin or bentonite. Instead of a solid diluent, there may be used a liquid in which the oxa(or thia)diazole is dissolved or dispersed. The compositions may thus take the form of suspensions, emulsions or solutions in organic or aqueous-organic media, for example aromatic hydrocarbons such as toluene or xylene or mineral, animal or vegetable oils, or mixtures of these diluents. The compositions in the form of dispersions, solutions or emulsions may contain wetting, dispersing or emulsifying agents of the ionic or non-ionic type, for example sulphoricinoleates, quaternary ammonium derivatives or products based on condensates of ethylene oxide, such as the condensates of ethylene oxide with octylphenol, or fatty acid esters of anhydrosorbitols which have been rendered soluble by etherification of the free hydroxyl groups by condensation with ethylene oxide. It is preferable to use agents of the non-ionic type because they are not sensitive to electrolytes. When desired, emulsions of the thiadiazolones may be used in the form of self-emulsifying concentrates containing the active substance dissolved in the dispersing agent or in a solvent containing a dispersing agent compatible with the active oxa(or thia)diazole and solvent, a simple addition of water producing compositions ready for use.

The solid compositions are preferably prepared by grinding the oxa(or thia)diazole with the solid diluent and optionally a wetting, dispersing or emulsifying agent, or by impregnating the solid diluent with a solution of the oxa(or thia)diazole in a volatile solvent, evaporating the solvent, and if necessary grinding the product so as to obtain a powder.

Fertilisers may be admixed with the aforesaid compositions.

For fungicidal purposes in agriculture the active substances may be employed in dosages varying within relatively wide limits but dosages corresponding to a quantity of from 20 to 600 g. (preferably 100 to 200 g.) of active substance per hectare are generally suitable.

The following example, in which the parts mentioned are parts by weight, illustrates fungicidal compositions suitable for use in agriculture.

Example X

A mixture of 3-trichloromethylthio-5-(4-methylphenyl)-1,3,4-oxadiazol-2-one (5 parts), talc (4.5 parts) and a wetting agent (0.5 part) obtained by the condensation of ethylene oxide (10 molecules) with octylphenol (1 molecule) is finely ground in a mortar. The powder obtained can be used, after suspension in water so as to obtain 100 to 200 g. of oxadiazolone per hectolitre, to treat apple trees against scab.

Other compounds conforming to Formula I, in particular 3-trichloromethylthio-5-phenyl-1,3,4-oxadiazol-2-one, may be incorporated in similar compositions.

According to another feature of the invention, a method for the treatment of plants or trees infected by fungi, or to prevent infection by fungi, comprises applying to the plants or trees a fungicidal composition containing at least one oxa(or thia)diazole compound of Formula I. Apple trees, potato plants or tobacco plants may, for example, be treated to control, or prevent infection by, apple-scab, or potato blight or tobacco mildew respectively.

The fungicidal properties of the compounds of Formula I may also be utilised in therapeutics. The compounds are active against a number of fungi, amongst which may be mentioned *Candida albicans, Trichophyton mentagrophytes, Trichophyton rubrum, Microsporum audouini, Microsporum felis, Epidermophyton floccosum* and *Aspergillus fumigatus*. The compounds are well-tolerated by the skin and are, in consequence, particularly suitable for the treatment of mycoses.

According to a still further feature of the invention, there are provided pharmaceutical compositions which comprise, as active ingredient, at least one oxa(or thia)diazole compound of Formula I in association with a pharmaceutically-acceptable carrier or coating. The compositions may be in the usual forms appropriate for oral administration or for local treatment. Compositions for local treatment, which are preferred, may take the form of ointments or creams in which the pharmaceutical carriers employed are preferably of a hydrophobic nature, such as vaseline and other hydrocarbon fats. For certain applications, it may be desirable to replace the ointments by dry powders in which the carriers are, for example, powdered alginic acid derivatives, lactose or sorbitol. Formulations for local treatment may also take the form of vaginal tablets in which at least one of the compounds of Formula I is mixed with one or more inert diluents customarily used for this purpose.

Solid compositions for oral administration include compressed tablets, pills, dispersible powders, and granules. In such solid compositions one or more of the active compounds is, or are, admixed with at least one inert diluent such as calcium carbonate, potato starch, alginic acid, sucrose or lactose. The compositions may also comprise, as is normal practice, additional substances other than inert diluents, e.g. lubricating agents, such as magnesium stearate. Compositions according to the invention for oral administration also include capsules of absorbable material such as gelatin containing one or more of the active substances with or without the addition of diluents or excipients.

The amount of active material in the above-mentioned compositions preferably corresponds to 0.1 to 5% by weight. Such compositions may be used for the treatment of superficial mycoses such as ringworm and candidiases such as vaginal candidiasis. They may also be used for intestinal disinfection.

The dosages used depend upon the therapeutic effect sought, the method of administration and the length of the treatment; for dermatological purposes, the use of an ointment containing 5% (by weight) of active ingredient generally gives satisfactory results.

The following examples illustrate pharmaceutical compositions according to the present invention.

Example XI

An ointment is prepared by the usual procedures containing 5% of active ingredient and having the following composition:

| | G. |
|---|---|
| 3 - trichloromethylthio - 5-phenyl-1,3,4-oxadiazol-2-one | 5.0 |
| Lanoline | 10.0 |
| Vaseline | 85.0 |

Example XII

Vaginal tablets weighing 1455 mg. and containing 250 mg. of active material are prepared, having the following composition:

| | G. |
|---|---|
| 3 - trichloromethylthio - 5-phenyl-1,3,4-oxadiazol-2-one | 0.250 |
| Starch | 0.824 |
| Precipitated silica | 0.080 |
| Lactose | 0.220 |
| Alginic acid | 0.060 |
| Potato starch | 0.010 |
| Magnesium stearate | 0.011 |

We claim:

1. A compound of the formula:

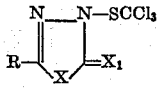

wherein X and $X_1$ represent members of the class consisting of oxygen and sulphur atoms, and R represents a member of the class consisting of hydrogen, alkyl, halogeno-alkyl, nitro-alkyl, cyano-alkyl, alkenyl, alkyl and alkenyl the chain of which is interrupted by a member of the class consisting of oxygen, sulphur, sulphoxyl, and sulphonyl, alkylthio, alkoxycarbonyl, carbamoyl, N-alkyl-carbamoyl, N,N-dialkylcarbamoyl, phenyl, naphthyl, phenylalkyl of 7 to 10 carbon atoms, naphthylalkyl of 10 to 12 carbon atoms, phenylalkyl of 7 to 10 carbon atoms and naphthylalkyl of 10 to 12 carbon atoms the alkyl moieties of which are separated from the aryl group by a member of the class consisting of oxygen and sulphur, phenylalkyl of 7 to 10 carbon atoms and naphthylalkyl of 10 to 12 carbon atoms the alkyl moieties of which are interrupted by a member of the class consisting of oxygen, sulphur, sulphoxyl and sulphonyl, cycloalkyl, cycloalkyl-alkyl, furyl, pyridyl, 1,3,4-oxadiazolyl, furylalkyl, pyridylalkyl, 1,3,4-oxadiazolylalkyl, and phenyl, naphthyl, phenylalkyl, naphthylalkyl, furyl, pyridyl, 1,3,4-oxadiazolyl, furylalkyl, pyridylalkyl, and 1,3,4-oxadiazolylalkyl groups as aforesaid carrying as substituents at least one member of the class consisting of halogen, nitro, cyano, alkyl, alkoxy, alkenyl, alkenyloxy, alkylthio, trichloromethylthio, hydroxy, alkoxycarbonyl, alkanesulphonyl, trifluoromethyl, carbamoyl, sulphamoyl, and N-alkyl-substituted carbamoyl and sulphamoyl, the said alkyl, alkenyl, alkoxy and alkane groups each containing not more than 4 carbon atoms.

2. 3 - trichloromethylthio - 5-phenyl-1,3,4-oxadiazol-2-one.

3. 3 - trichloromethylthio - 5-methylthiomethyl-1,3,4-oxadiazol-2-one.

4. 3 - trichloromethylthio - 5-allylsulphonylmethyl-1,3,4-oxadiazol-2-one.

5. 3 - trichloromethylthio - 5-cyclohexylmethyl-1,3,4-oxadiazol-2-one.

6. 3 - trichloromethylthio - 5-isopropylthiomethyl-1,3,4-oxadiazol-2-one.

7. 3 - trichloromethylthio - 5-ethoxycarbonyl-1,3,4-oxadiazol-2-one.

8. 3 - trichloromethylthio - 5-methylcarbamoyl-1,3,4-oxadiazol-2-one.

9. 3 - trichloromethylthio - 5-benzyl-1,3,4-oxadiazol-2-one.

References Cited in the file of this patent

UNITED STATES PATENTS

| 2,553,775 | 5/51 | Hawley et al. | 167—330 |
| 2,638,434 | 5/53 | Adkins | 167—63 |
| 2,852,523 | 9/58 | Lopresti et la. | 260—307 |
| 2,863,803 | 12/58 | Benghiat et al. | 167—33 |
| 2,918,473 | 12/59 | Sherman | 260—307 |

NICHOLAS S. RIZZO, *Primary Examiner.*

JULIAN S. LEVITT, IRVING MARCUS, *Examiners.*